F. F. BRUCKER.
METHOD OF AND APPARATUS FOR APPLYING RUBBER COVERS TO TIRE CARCASSES.
APPLICATION FILED FEB. 28, 1916.

1,220,178.

Patented Mar. 27, 1917.
2 SHEETS—SHEET 1.

Inventor:
Ferdinand F. Brucker,
by Offer Middleton Donaldson Offer
Attys.

F. F. BRUCKER.
METHOD OF AND APPARATUS FOR APPLYING RUBBER COVERS TO TIRE CARCASSES.
APPLICATION FILED FEB. 28, 1916.

1,220,178.

Patented Mar. 27, 1917.
2 SHEETS—SHEET 2.

Inventor:
Ferdinand F. Brucker,
by Spear Middleton Donaldson Spear
Attys.

UNITED STATES PATENT OFFICE.

FERDINAND F. BRUCKER, OF AKRON, OHIO, ASSIGNOR TO THE MILLER RUBBER CO., OF AKRON, OHIO, A CORPORATION OF OHIO.

METHOD OF AND APPARATUS FOR APPLYING RUBBER COVERS TO TIRE-CARCASSES.

1,220,178.　　　　　　　Specification of Letters Patent.　　Patented Mar. 27, 1917.

Application filed February 28, 1916. Serial No. 81,001.

*To all whom it may concern:*

Be it known that I, FERDINAND F. BRUCKER, a citizen of the United States, residing at Akron, Ohio, have invented certain new and useful Improvements in Methods of and Apparatus for Applying Rubber Covers to Tire-Carcasses, of which the following is a specification.

My present invention relates to improvements in the manufacture of pneumatic tires, such as used more especially on motor vehicles, and comprises an improved method of and means for applying the outer layers of rubber which form the covering for the fabric body or carcass.

Heretofore, in the manufacture of pneumatic tires, it has been customary to build up a fabric body or carcass upon a suitable core and thereafter to apply to the tread and side portions of the carcass successively and in proper order the various strips of rubber which go to form the outer protecting rubber cover or surface of the tire. A considerable number of such strips are necessary to form the complete covering and these are usually supported upon fabric frames in position convenient to the operator, who takes them one at a time and applies them by hand, the proper positioning of the strips being determined fully by the hand guided only by the eye as the core is rotated and the rubber strips being caused to adhere to the tire carcass or to the underlying previously applied strips by the use of a hand roller.

According to my present invention, I assemble or mount said strips one upon the other previously to the application thereof to the carcass and preferably as they issue from the calender, so that they form what may be termed a slab, with the several rubber strips or parts united in such position that such slab may be applied as a unitary article to the fabric body or carcass.

In order to illustrate my invention, reference is made to the accompanying drawings, in which—

Figure 1:
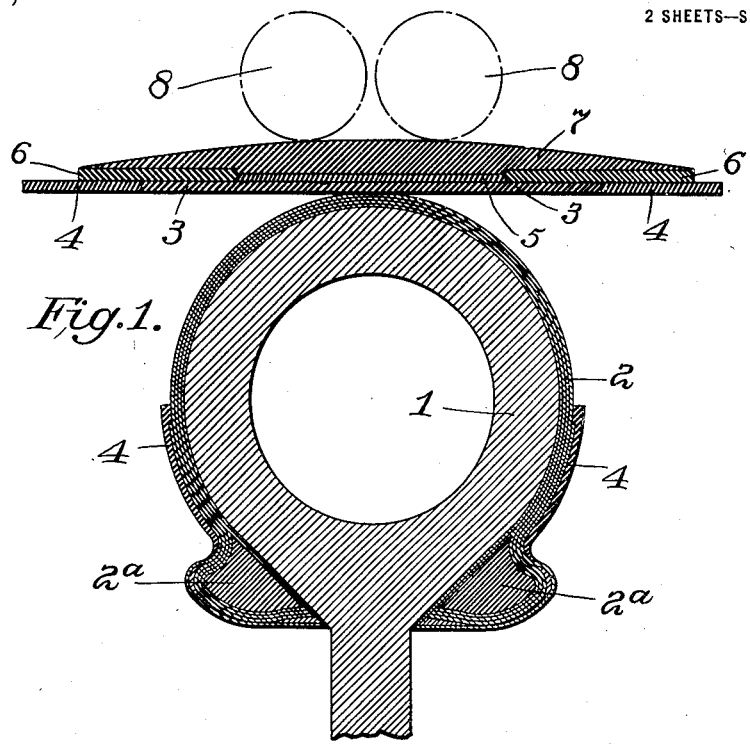
Figure 1 shows a cross section of a core with the carcass applied thereto and the slab in the position it would assume prior to, or at the time of, its application to the carcass.
Figure 3:
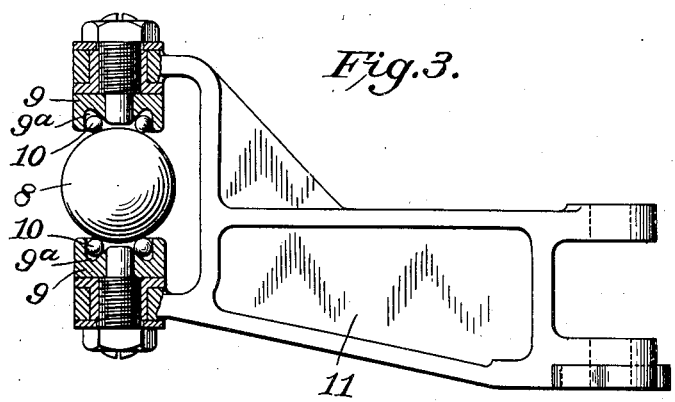
Figs. 3, 4 and 5 are views of means which I use to effect the application of the slab to the carcass.
Figure 2:
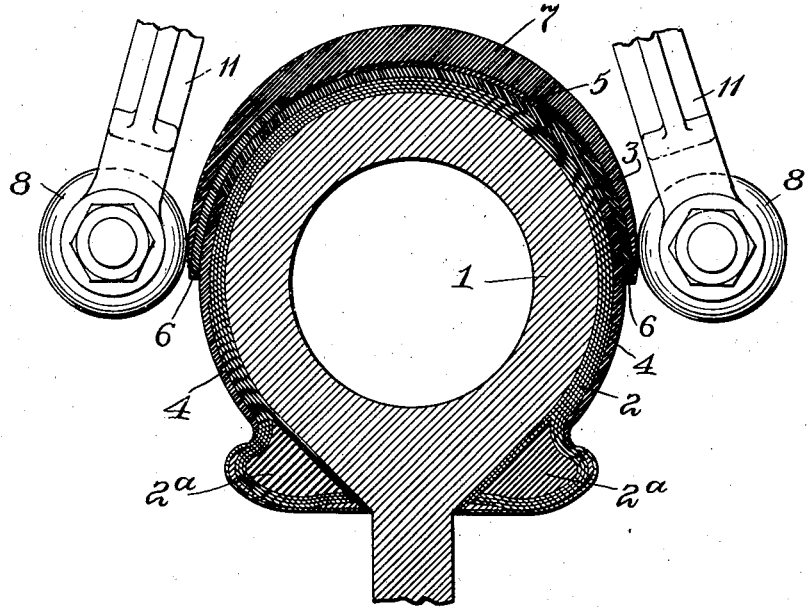
Fig. 2 is a similar view showing the rubber covering as completely applied to and rolled down upon the carcass to place the tire in condition to be vulcanized with the rolling devices in position against the rubber covering.
Figure 4:
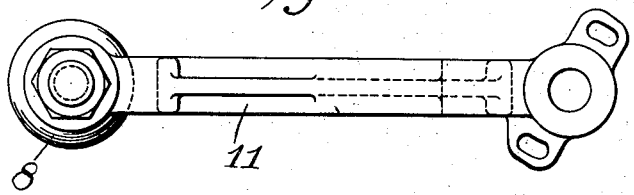
Figure 5:
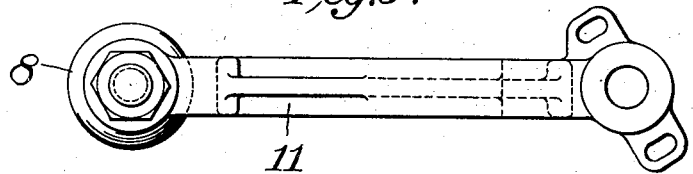

Referring by reference characters to this drawing, the numeral 1 designates the core and 2 the tire carcass formed thereon, these being representative of any ordinary or desired form of core and carcass. It will be understood that for this carcass to be capable of use as a tire, the fabric must be completely covered by a protecting covering of rubber and which, as above stated, has always been formed from a plurality of strips individually and successively applied. Such strips usually take the form and number shown in the drawing, in which 3 indicates a cushion strip adapted to cover the tread portion and extend part way down the tire sides, 4 the side strips abutting against the edges of the cushion strip and extending the balance of the way down the sides to the beads of the tire indicated at $2^a$, 5 a breaker strip applied to the surface of the cushion strip and usually of less width, 6 the filler strip abutting against the edges of the breaker strip and overlapping the lines of junction between the cushion and side strips, while 7 indicates the tread strip which, in an assembled position, overlies the breaker strip and filler strips.

In proceeding according to my invention, these various strips would be assembled into a slab form, preferably by running them from suitable calenders or feed devices directly together to form a complete slab, as shown in Fig. 1, and the end of this slab would be brought into position with relation to the carcass and core, as shown in said figure. The core being rotated, the slab would be subjected to the action of a pair of rolling devices, capable of rolling circumferentially of the core as the same rotates and also radially of the core. A pair of such rolling devices are indicated at 8 in the form of balls or spherical bodies mounted so as to rotate freely in one direction and with slight friction in other directions, as for instance, by having them mounted between a pair of opposing abutments 9, recessed to provide annular ball races $9^a$, within which rest the balls 10, between the two sets of which the shaping balls or spheres 110

8 are rotatably held. These opposing abutments 9 are preferably secured by means of threaded stems and lock nuts to the arms 11, which are pivotally mounted upon a carriage adapted to move radially of the core, said arms being adapted to be operated by any suitable spring mechanism, cam mechanism or by hand to cause them to yieldingly separate to travel down over the sides of the core, during the rotation thereof, to assume the successive positions indicated in the drawings. As the manner of mounting these arms forms no part of the present invention, further illustration thereof is deemed unnecessary, it being understood that they may be mounted on carriages, substantially such as are used in the known types of stitching machines used for stitching down the fabric layers to form the carcass.

It will be seen that the balls may revolve in one plane with very little friction; free revolution in this plane being highly desirable because it is not desirable to stretch the rubber in this direction, to wit; radially of the tire but the balls may also revolve in any other plane; such motion being imparted by the revolution of the core and this revolutionary action is impeded by the slight or clicking friction of the large balls on the small balls.

Having thus described my invention, what I claim is:

1. The herein described method of finishing a pneumatic tire, which consists in assembling in slab form the plurality of rubber strips comprising the rubber covering of the tire carcass, and applying said slab to the carcass by a progressive rolling action.

2. The herein described method of finishing pneumatic tires, which consists in assembling in slab form the plurality of rubber strips comprising the rubber covering of the tire carcass, and applying said slab to the carcass by the progressive rolling action of spherical rollers moving in a path which is a compound of a circumferential and radial movement.

3. A device for applying rubber covering to a tire carcass, comprising a pair of spherical devices movable toward and from each other, and means for supporting them so as to be rotatable in all directions.

4. Means for applying the rubber covering to a tire carcass, comprising a pair of swinging forked arms, spherical rolling devices, and opposing ball bearings carried by the forks of the arms and supporting said spherical rolling devices.

In testimony whereof, I affix my signature.

FERDINAND FRANCIS BRUCKER.